US012694805B2

(12) United States Patent
Li et al.

(10) Patent No.: US 12,694,805 B2
(45) Date of Patent: Jul. 28, 2026

(54) METHOD FOR DISPLAYING CONTENT, STORAGE MEDIUM, AND ELECTRONIC DEVICE

(71) Applicant: BOE TECHNOLOGY GROUP CO., LTD., Beijing (CN)

(72) Inventors: Xianzhen Li, Beijing (CN); Tianyue Zhao, Beijing (CN); Enhui Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/685,197

(22) PCT Filed: Oct. 26, 2021

(86) PCT No.: PCT/CN2021/126493
§ 371 (c)(1),
(2) Date: Feb. 20, 2024

(87) PCT Pub. No.: WO2023/070329
PCT Pub. Date: May 4, 2023

(65) Prior Publication Data
US 2024/0346965 A1 Oct. 17, 2024

(51) Int. Cl.
*G09G 3/00* (2006.01)
*G06T 7/73* (2017.01)

(52) U.S. Cl.
CPC .............. *G09G 3/001* (2013.01); *G06T 7/73* (2017.01); *G06T 2207/10028* (2013.01); *G06T 2207/30196* (2013.01); *G09G 2354/00* (2013.01)

(58) Field of Classification Search
CPC ...... G09G 3/001; G09G 2354/00; G09G 5/14; G09G 5/38; G06T 7/73;
(Continued)

(56) References Cited

U.S. PATENT DOCUMENTS

2004/0070616 A1* 4/2004 Hildebrandt ............ G06F 21/84
715/764
2014/0160153 A1* 6/2014 Singh ..................... G09B 19/00
345/629
(Continued)

FOREIGN PATENT DOCUMENTS

CN 104346125 A 2/2015
CN 106970681 A 7/2017
(Continued)

OTHER PUBLICATIONS

International Preliminary Report on Patentability of PCT/CN2021/126493 Dated Jul. 15, 2022 with English Translation, (9p).
(Continued)

*Primary Examiner* — Sahlu Okebato
(74) *Attorney, Agent, or Firm* — Arch & Lake LLP

(57) ABSTRACT

The present disclosure relates to the technical field of display, and in particular to a method for displaying content, a storage medium, and an electronic device. The method for displaying content includes: determining, based on a viewing angle and spatial position information of a viewer, a visible area corresponding to the viewer in a display device; determining a writing area of a writer in the display device, and determining a display area in the display device, other than the writing area, as a candidate area; determining, based on the visible area, a target area in the candidate area for the viewer, the target area corresponding to the writing area; and displaying, within the target area, written content of the writing area.

16 Claims, 13 Drawing Sheets

(58) Field of Classification Search
CPC . G06T 2207/10028; G06T 2207/30196; G06F
3/04883; G06F 3/04886
See application file for complete search history.

(56) References Cited

U.S. PATENT DOCUMENTS

| | | | | |
|---|---|---|---|---|
| 2015/0109533 | A1* | 4/2015 | Ikeda | H04N 9/646 |
| | | | | 348/566 |
| 2017/0139535 | A1* | 5/2017 | Files | G06F 3/0346 |
| 2021/0064233 | A1* | 3/2021 | Jung | G06F 3/0484 |
| 2021/0232294 | A1 | 7/2021 | Nakajima et al. | |
| 2021/0274140 | A1* | 9/2021 | Hailpern | H04N 7/15 |

FOREIGN PATENT DOCUMENTS

| | | |
|---|---|---|
| CN | 111414114 A | 7/2020 |
| CN | 112887689 A | 6/2021 |
| JP | 2009116727 A | 5/2009 |

OTHER PUBLICATIONS

International Search Report of PCT/CN2021/126493 dated Jul. 15, 2022 with English translation, (8p).

* cited by examiner

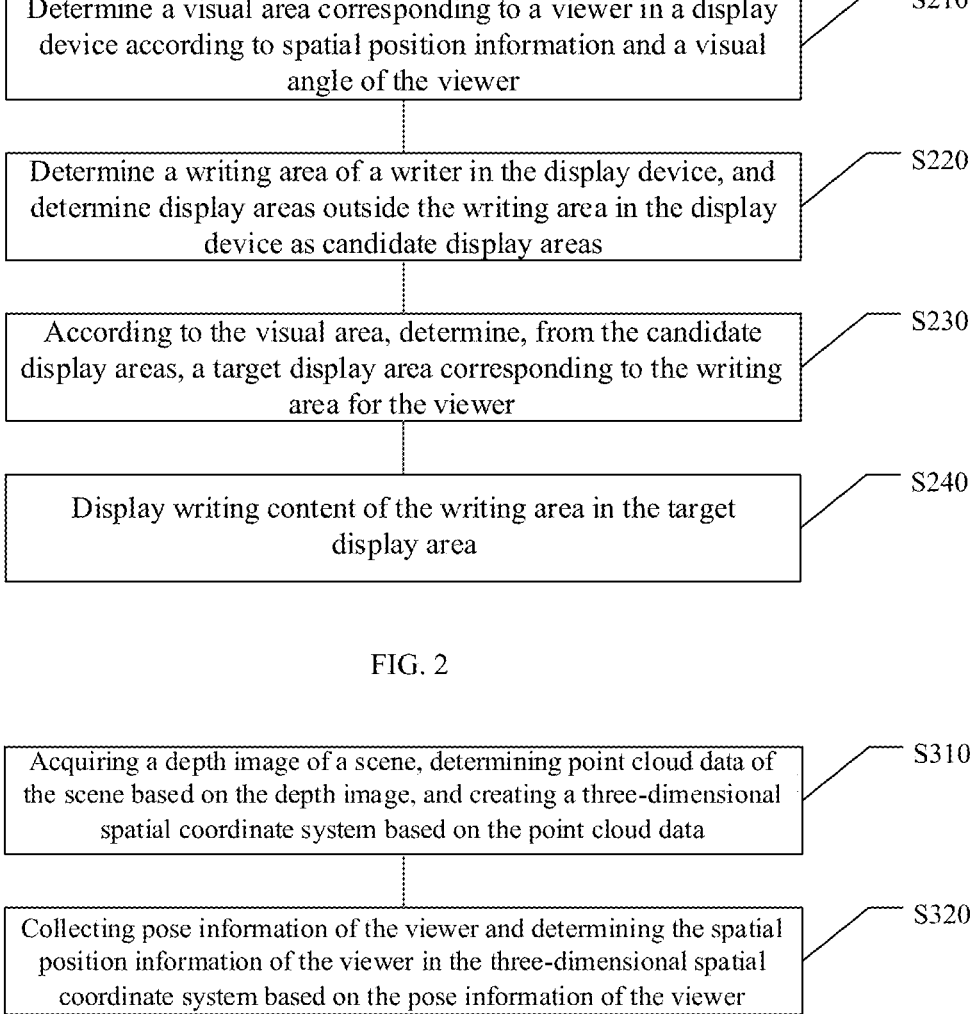

Determine a visual area corresponding to a viewer in a display device according to spatial position information and a visual angle of the viewer    S210

Determine a writing area of a writer in the display device, and determine display areas outside the writing area in the display device as candidate display areas    S220

According to the visual area, determine, from the candidate display areas, a target display area corresponding to the writing area for the viewer    S230

Display writing content of the writing area in the target display area    S240

FIG. 2

Acquiring a depth image of a scene, determining point cloud data of the scene based on the depth image, and creating a three-dimensional spatial coordinate system based on the point cloud data    S310

Collecting pose information of the viewer and determining the spatial position information of the viewer in the three-dimensional spatial coordinate system based on the pose information of the viewer    S320

METHOD FOR DISPLAYING CONTENT, STORAGE MEDIUM, AND ELECTRONIC DEVICE

CROSS-REFERENCE TO RELATED APPLICATIONS

The present application is the U.S. national phase application of International Application No. PCT/CN2021/126493, filed on Oct. 26, 2021, the entire contents of which are hereby incorporated by reference for all purposes.

TECHNICAL FIELD

The present disclosure relates to the field of display technologies, and in particular, to a method for displaying content, an apparatus for displaying content, a computer-readable storage medium, and an electronic device.

BACKGROUND

At present, more and more display devices are equipped with writing functions. However, due to limitations such as a height or an arm length of a writer, and other factors, the writer tends to be able to write only on parts of the display device. At the same time, a viewer tends to view at a fixed location.

Further, factors such as other viewers in front of the viewer's seat and writers in proximity of the display device may interfere with the viewer's ability to view written content, which may result in less effective listening for the viewer and affect the user experience.

It is to be noted that the information disclosed above in the "BACKGROUND" section is intended only to enhance understanding of the context of the present disclosure, and thus may include information that does not constitute prior art known to those of ordinary skill in the art.

SUMMARY

The present disclosure provides a method for displaying content, an electronic device, and a computer-readable storage medium.

According to an aspect of the present disclosure, a method for displaying content is provided. The method includes: determining, based on a viewing angle and spatial position information of a viewer, a visible area corresponding to the viewer in a display device; determining a writing area of a writer in the display device, and determining a display area in the display device, other than the writing area, as a candidate area; determining, based on the visible area, a target area in the candidate area for the viewer, the target area corresponding to the writing area; and displaying, within the target area, written content of the writing area.

In an exemplary embodiment of the present disclosure, the method further includes: acquiring a depth image of a scene, determining point cloud data of the scene based on the depth image, and creating a three-dimensional spatial coordinate system based on the point cloud data; and collecting pose information of the viewer and determining the spatial position information of the viewer in the three-dimensional spatial coordinate system based on the pose information of the viewer.

In an exemplary embodiment of the present disclosure, determining the visible area corresponding to the viewer in the display device includes: determining a field of view of the viewer based on the viewing angle and the spatial position information of the viewer; determining a projected area of the field of view of the viewer on the display device; and determining the projected area as the visible area corresponding to the viewer.

In an exemplary embodiment of the present disclosure, determining the visible area corresponding to the viewer in the display device includes: determining a field of view of the viewer based on the viewing angle and the spatial position information of the viewer; determining a first projected area of the field of view of the viewer on the display device; determining a second projected area of a vision obstruction on the display device, the vision obstruction being between the viewer and the display device; and determining a portion of the first projected area that does not overlap with the second projected area as the visible area corresponding to the viewer.

In an exemplary embodiment of the present disclosure, determining the writing area of the writer in the display device includes: acquiring the written content of the writer in the display device; and determining a rectangular area that minimizes an enclosure of the written content as the writing area.

In an exemplary embodiment of the present disclosure, determining the target area corresponding to the writing area for the viewer in the candidate area includes: dividing the candidate area into a plurality of candidate sub-areas; determining, based on a size of the target area, a number of candidate sub-areas (N) to be contained by the target area; evaluating the plurality of candidate sub-areas based on the visible area; and selecting, based on an evaluation result of the evaluation, N candidate sub-areas that are adjacent to each other as the target area.

In an exemplary embodiment of the present disclosure, the method further includes: determining, based on a size of the writing area, the size of the target area; wherein the size of the target area is greater than or equal to the size of the writing area, and the size of the target area is an integer multiple of a size of a candidate sub-area.

In an exemplary embodiment of the present disclosure, determining the size of the target area based on the size of the writing area includes: enlarging the writing area by a predetermined number of times; and determining the size of the target area based on the size of the enlarged writing area.

In an exemplary embodiment of the present disclosure, a plurality of viewers exist; and evaluating the plurality of candidate sub-areas based on the visible area includes: determining, based on the visible area corresponding to each viewer of the plurality of viewers, a candidate sub-area corresponding to each viewer; determining, for each candidate sub-area, a number of instances of the candidate sub-area in candidate sub-areas corresponding to the plurality of viewers; and determining, based on the number of instances, the evaluation result of each candidate sub-area.

In an exemplary embodiment of the present disclosure, the method further includes: determining the viewer based on an instruction for selecting a viewer.

According to an aspect of the present disclosure, an electronic device is provided. The device includes a processor, and a memory configured to store one or more programs which, when executed by the processor, cause the processor to implement the method provided in some aspects of the present disclosure.

According to an aspect of the present disclosure, there is provided a non-transitory computer-readable storage medium on which is stored a computer program that, when executed by a processor, causes the processor to implement the method provided in some aspects of the present disclosure.

It is to be understood that the above general description and the following detailed descriptions are exemplary and explanatory only and do not limit the present disclosure.

BRIEF DESCRIPTION OF THE DRAWINGS

The accompanying drawings herein are incorporated into and form part of the specification, show embodiments that are consistent with the present disclosure, and are used in conjunction with the specification to explain the principles of the present disclosure. It will be apparent that the accompanying drawings in the following description are only some of embodiments of the present disclosure, and that other drawings may be obtained from these drawings without creative effort by those of ordinary skill in the art.

FIG. 2 illustrates a flowchart of a method for displaying content according to embodiments of the present disclosure.

FIG. 3 illustrates a flowchart of determining spatial position information of a viewer according to embodiments of the present disclosure.

DETAILED DESCRIPTION

Figure 1:
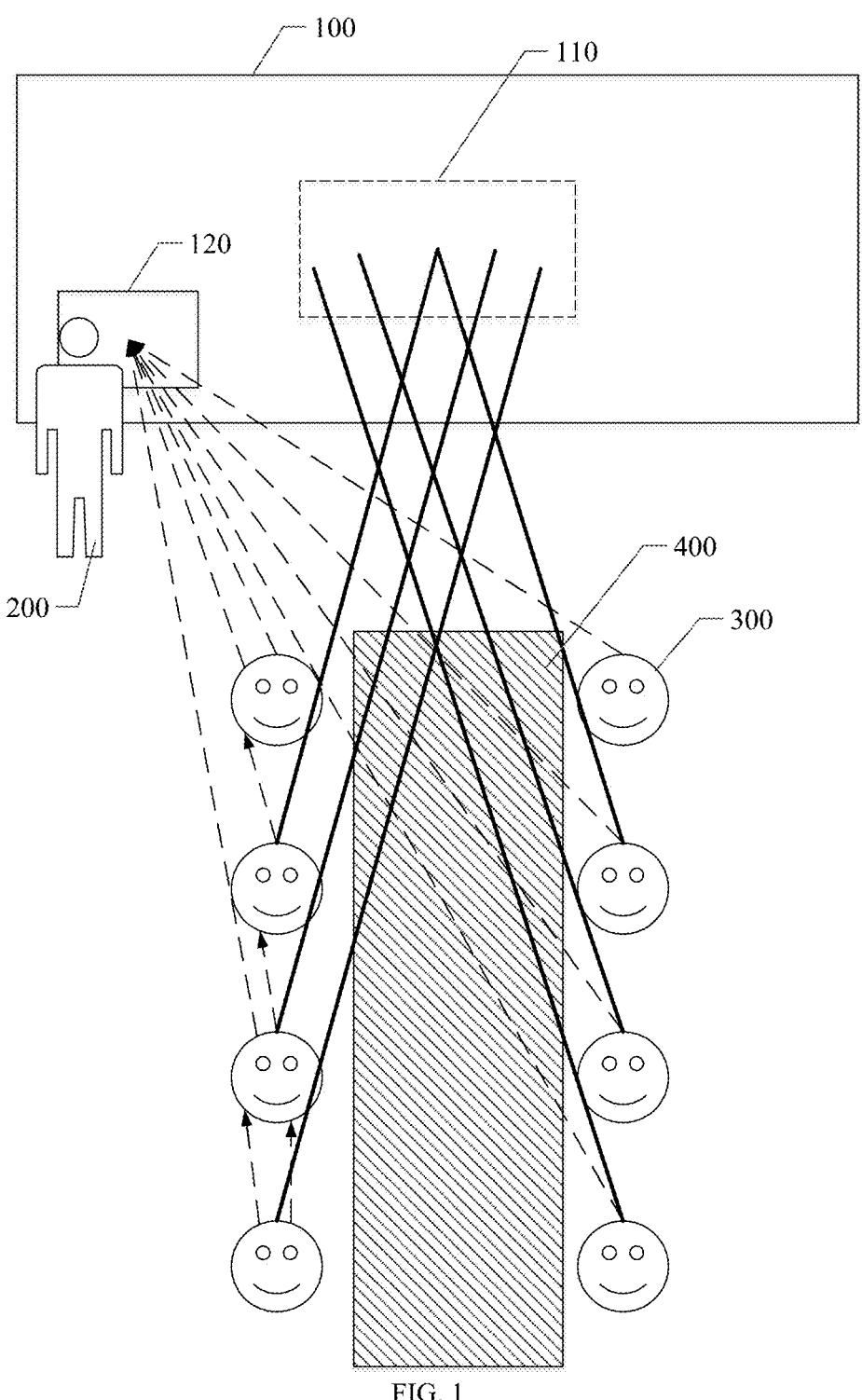
FIG. 1 illustrates a schematic diagram of an application scenario of a method for displaying content according to embodiments of the present disclosure.

Exemplary embodiments will now be described more fully with reference to the accompanying drawings. However, the exemplary embodiments can be implemented in a variety of forms and should not be construed as being limited to the examples set forth herein; rather, the provision of these embodiments makes the present disclosure comprehensive and complete and conveys the concepts of the exemplary embodiments to those skilled in the art in a comprehensive manner. The features, structures, or characteristics described may be combined in one or more embodiments in any suitable manner.

In addition, the accompanying drawings are only schematic illustrations of the present disclosure and are not necessarily drawn to scale. The same numerals in the drawings indicate the same or similar portions, and thus repetitive descriptions of them will be omitted. Some of the block diagrams shown in the accompanying drawings are functional entities that do not necessarily have to correspond to physically or logically separate entities. These functional entities may be implemented in software form, or in one or more hardware modules or integrated circuits, or in different networks and/or processor devices and/or microcontroller devices.

It is to be noted that, in the present disclosure, the terms "comprising/including", "configured with", and "provided with" are used to indicate open-ended inclusion, and mean that there may be other elements/components/etc. in addition to the listed elements/components/etc.

FIG. 1 illustrates a schematic diagram of an exemplary application scenario in which a method for displaying content of embodiments of the present disclosure may be applied. In the application scenario, at least a display device 100, a writer 200, and a viewer 300 are included. In this exemplary embodiment, the display device 100 may be an electronic whiteboard. The electronic whiteboard is an interactive display device with a large-size display screen. By means of a specific stylus, writing operations or other operations such as editing, annotating, saving, etc. may be carried out on the electronic whiteboard. The electronic whiteboard may be applied in a conference presentation or teaching environment for a user to make a presentation or explanation. Of course, in other exemplary embodiments of the present disclosure, the display device 100 may also be other display devices capable of realizing the writing function as well as the display function, and the present exemplary embodiments are not limited thereto. In addition, the display device 100 may also be provided with a mechanism having arithmetic processing functions. The mechnisms include, for example, a built-in processor for realizing the arithmetic processing functions, or an external server for realizing the arithmetic processing functions, and the like. In this application scenario, the viewer 300 may be a participant, a student, an audience, and the like; and the writer 200 may be a participant, a lecturer, a presenter, and the like. The writer 200 may write content to be displayed on the display device 100, such as main points, highlights, equations, flowcharts, schematic diagrams, or other content. The viewer 300's eyes will follow the speaker's handwriting and view the written content.

Continuing to refer to FIG. 1, due to the limitation of the height, arm length, and other factors of the writer 200, the writer 200 tends to be able to write only in parts of the display device. At the same time, the viewer 300 tends to view at a fixed location (e.g., around the periphery of a conference table 400). Moreover, factors such as other viewers in front of the seat of the viewer, and the writer 200 in proximity of the display device 100, and other factors may interfere with the viewer's viewing of the written content, thereby causing the viewer's listening effect to be reduced and affecting the user experience.

Referring to FIG. 2, in response to at least part of the above-described problems, a method for displaying content is provided in this exemplary embodiment. This method may be performed by the above-described mechanism having the arithmetic processing functions built-in or externally connected to the display device. The method for displaying content provided in this exemplary embodiment may include the following steps S210 to S240.

Step S210, determining, based on a viewing angle and spatial position information of a viewer, a visible area corresponding to the viewer in a display device.

Step S220, determining a writing area of a writer in the display device, and determining a display area in the display device, other than the writing area, as a candidate area.

Step S230, determining, based on the visible area, a target area in the candidate area for the viewer, the target area corresponding to the writing area.

Step S240, displaying, within the target area, written content of the writing area.

Based on the method for displaying content provided in the exemplary embodiments of the present disclosure, on the one hand, since the viewer can view the written content through the target area (e.g., a target area 110 shown in FIG. 1) in addition to directly viewing the writing area (e.g., a writing area 120 shown in FIG. 1), the viewer will not be affected in viewing the written content even if the writing area is blocked, which improves the efficiency of the information conveyance and enhances the listening effect of the viewer; on the other hand, since the target area is determined by combining the viewing angle and the spatial position information of the viewer, it is more convenient and more suitable for the viewer to view the target area, thereby improving the viewing experience of the viewer; and on yet another hand, even if the writer is only able to write in a small portion of the area of the display device due to limitations in height or other factors, the contents of the writing can be smoothly conveyed to the viewer, and thus it can be convenient for the writer to write in all areas of the display device without limitation. The spatial position information of the viewer includes, for example, the spatial position of the viewer and the spatial position of certain specific features of the viewer, such as the spatial position of the viewer's head or eyes.

Hereinafter, all steps of the method for displaying content in this exemplary embodiment will be described in more detail in connection with the accompanying drawings and embodiments.

In step S210, based on a viewing angle and spatial position information of a viewer, a visible area corresponding to the viewer in a display device is determined.

In this exemplary embodiment, depending on the application scenario, the spatial position information of the viewer may be determined in a variety of different ways. For example, if the application scenario is a place where the location of the viewer is relatively fixed (e.g., both the seat and the pose of the viewer remain unchanged for a long period of time), the spatial position information of the viewer may be pre-calibrated, and the pre-calibrated spatial position information of the viewer may then be directly acquired when it is required for use. For another example, if the application scenario is a place where the location of the viewer may change, such as a conference room, a classroom, etc., the spatial position information of the viewer may be acquired in real time or periodically. The spatial position information of the viewer may also be acquired after the spatial position information of the viewer is detected to have changed. This is not particularly limited in this exemplary embodiment.

For example, as shown in FIG. 3, the spatial position information of the viewer may be determined by the following step S310 and step S320.

Step S310, acquiring a depth image of a scene, determining point cloud data of the scene based on the depth image, and creating a three-dimensional spatial coordinate system based on the point cloud data.

Figure 4:
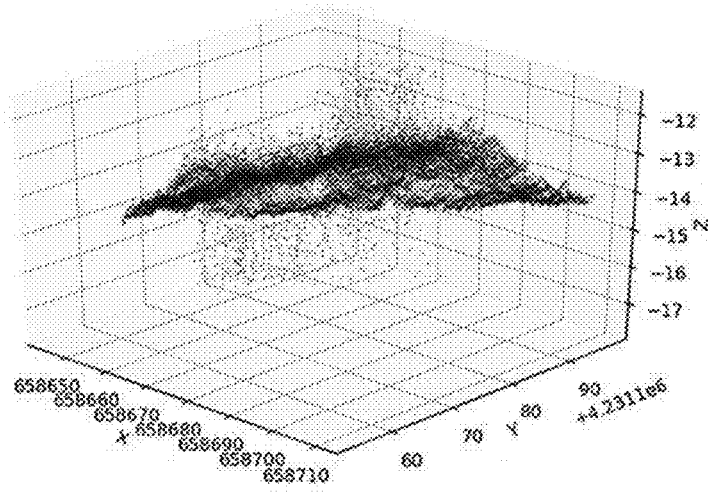
FIG. 4 illustrates a schematic diagram of a three-dimensional spatial coordinate system according to embodiments of the present disclosure.

In this exemplary embodiment, a three-dimensional scanning device, such as a lidar, a stereo camera, a time-of-flight camera, etc., may be utilized to scan the scene to acquire the images of objects in the scene (e.g., a display device, a conference table, a seat, a wall, a lectern, etc.) and the corresponding depth information thereof. Further, feature information may be obtained by feature extraction of the images of the objects in the scene, and the feature information can be utilized for visual tracking and motion estimation to obtain intermediate results; then, local point cloud data may be obtained by utilizing the depth information corresponding to the images of the objects as well as the internal parameters of the three-dimensional scanning device; and finally, global point cloud data may be generated by utilizing the above intermediate results and the local point cloud data, and thus a three-dimensional spatial coordinate system corresponding to the current scene may be constructed based on the global point cloud data. For example, the three-dimensional spatial coordinate system corresponding to the current scene may be in the form shown in FIG. 4.

Step S320, collecting pose information of the viewer and determining the spatial position information of the viewer in the three-dimensional spatial coordinate system based on the pose information of the viewer.

Figure 5:
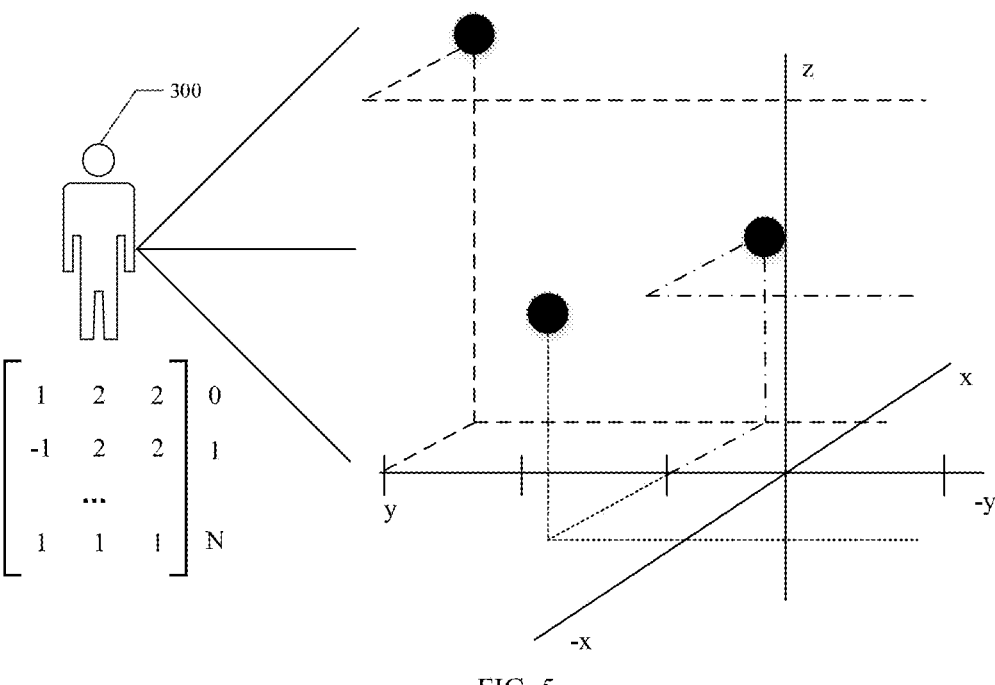
FIG. 5 illustrates a schematic diagram of determining pose information corresponding to a viewer according to embodiments of the present disclosure.

In this exemplary embodiment, the three-dimensional scanning device, such as a lidar, a stereo camera, a time-of-flight camera, etc., may also be utilized to scan the viewers to acquire images of the viewers and the corresponding depth information thereof. Based on the images of the viewers and the corresponding depth information thereof, the pose information of the viewer may be acquired. Of course, in some exemplary embodiments, it is also possible to acquire only the images of the viewers and then convert them to models such as a polygon or a triangle by a method such as surface reconstruction, so as to acquire the pose information of the viewer. After acquiring the pose information of the viewer, algorithms such as Iterative Closest Point (ICP) may be combined to determine the position of the viewer in the above-described three-dimensional spatial coordinate system. Referring to FIG. 5, the pose information corresponding to the viewers may be represented as an array of N rows and 3 columns (or other number of columns depending on the sensors). Each row of the array corresponds to a single point whose position in the three-dimensional spatial coordinate system is represented as (x, y, z). It is readily appreciated, however, that other methods may also be employed to determine the position of the viewer in the above-described three-dimensional spatial coordinate system, which is also within the scope of protection of the present disclosure.

Figure 6:
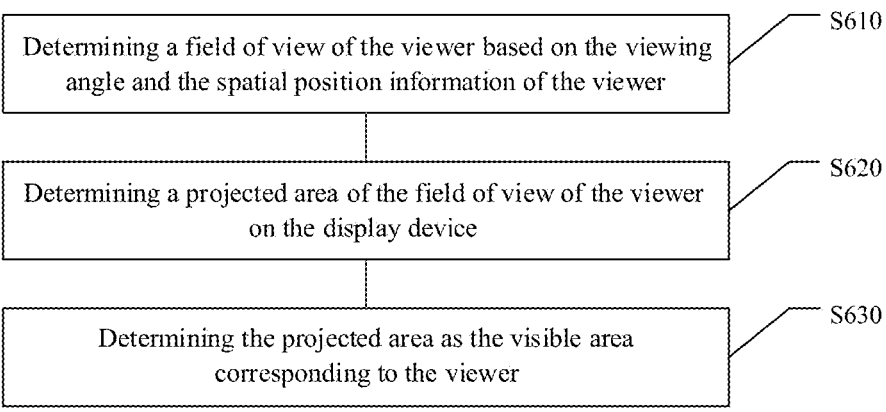
FIG. 6 illustrates a flowchart of determining a visible area of a viewer according to embodiments of the present disclosure.

Referring to FIG. 6, in this exemplary embodiment, the visible area in the display device that corresponds to the viewer may be determined by the following steps S610 to S630.

Step S610, determining a field of view of the viewer based on the viewing angle and the spatial position information of the viewer.

The angle at which the human eye can see objects in front of it at the same time is called the viewing angle. Viewing angles may be categorized from small to large as follows.

Monocular viewing angle I: The viewing angle when one eye is looking straight ahead, with no rotation of the eyeball and no rotation of the head forward. Taking the right eye as an example, the upper viewing angle is usually 50°, the lower viewing angle is usually 70°, the left viewing angle is usually 56°, and the right viewing angle is usually 100°.

Monocular viewing angle II: The viewing angle when one eye is looking straight ahead, with no rotation of the eyeball, and the head is rotatable. For a more complete representation of the visual range of the eye, the occlusion of the eye socket and nose can be removed. Taking the right eye as an example, the upper viewing angle is usually 55°, the lower viewing angle is usually 75°, the left viewing angle is usually 60°, and the right viewing angle is usually 100°.

Binocular viewing angle I: The viewing angle when both eyes are looking straight ahead, with no rotation of the eyeballs and no rotation of the head forward. The upper and lower viewing angles usually total 120°, and the left and right viewing angles usually total 200°.

Binocular viewing angle II: The viewing angle when both eyes are looking straight ahead, with no rotation of the eyeballs, and the head is rotatable. The upper and lower viewing angles usually total 130°, and the left and right viewing angles usually total 200°.

Monocular viewing angle III: The viewing angle when the eyeball is rotatable with no rotation of the head forward. Taking the right eye as an example, the upper viewing angle is usually 70°, the lower viewing angle is usually 80°, the left viewing angle is usually 65°, and the right viewing angle is usually 115°.

Binocular viewing angle III: The viewing angle when the eyeballs are rotatable with no rotation of the head forward. The upper and lower viewing angles usually total 150°, and left and right viewing angles usually total 230°.

Figure 7:
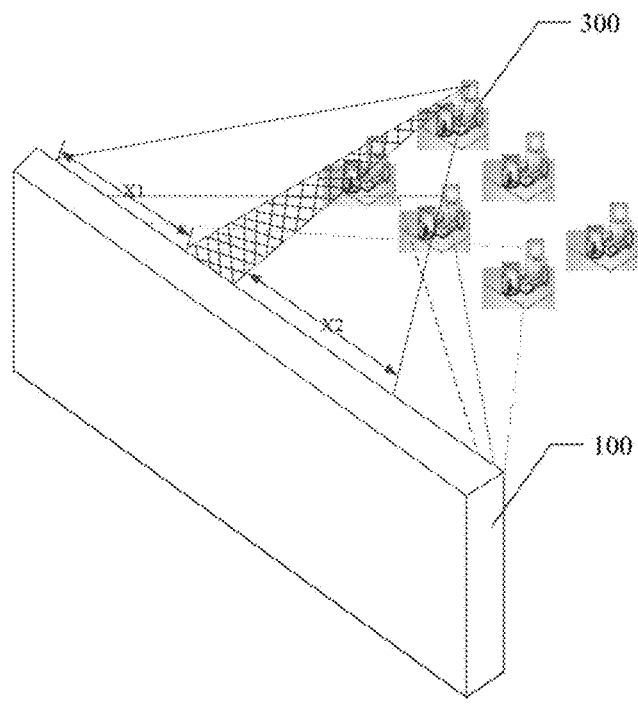
FIG. 7 illustrates a schematic diagram of an application scenario of a method for displaying content according to embodiments of the present disclosure.
Figure 8:
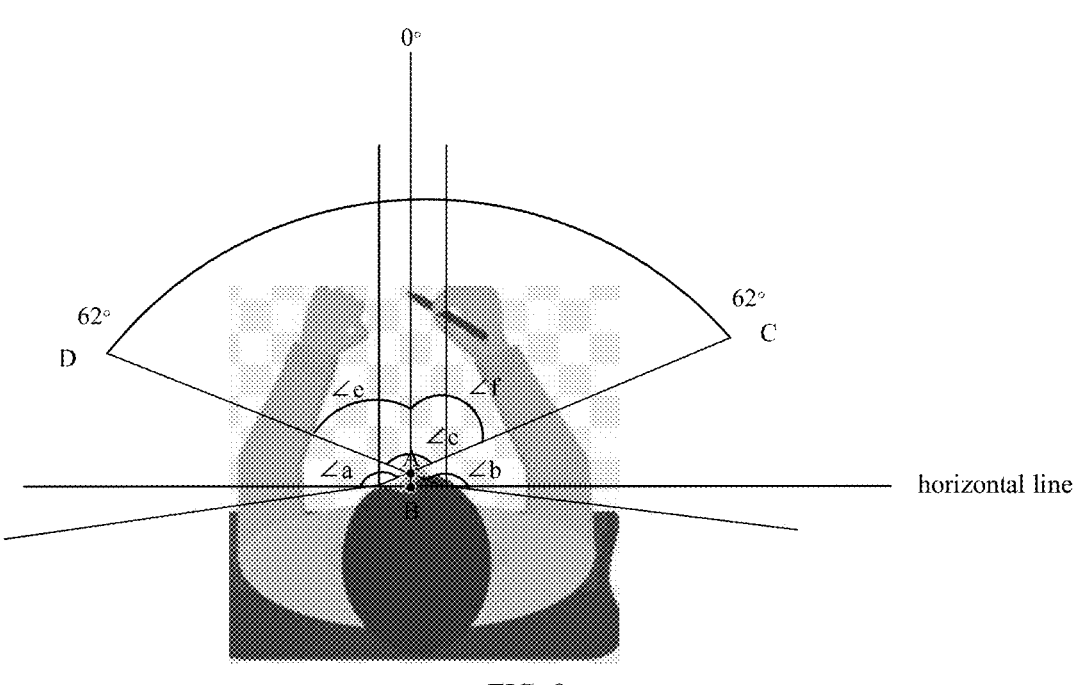
FIG. 8 illustrates a schematic diagram of a viewing angle of a human eye in a horizontal direction according to embodiments of the present disclosure.

Referring to FIG. 7 and FIG. 8, taking the conference scene as an example, the viewer in the conference usually views the board in a more comfortable posture, i.e., the eyeballs are rotatable, and the head basically does not rotate, and the viewer's monocular horizontal viewing angle is up to 180°, and the binocular horizontal viewing angle is up to 230°. However, within the viewing range of the human eye, usually only objects within the middle viewing angle of 124° have a three-dimensional sense (e.g., the middle area between the X1 and X2 in the figure). In addition, the human eye is usually sensitive within 10° of vision, can recognize information correctly within 10°-20°, and is relatively sensitive to moving things within 20°-30°. When the vertical viewing angle of the image is 20° and the horizontal viewing angle is 36°, the viewer usually has a better sense of visual presence and will not be tired from frequent eye rotations.

Figure 9:
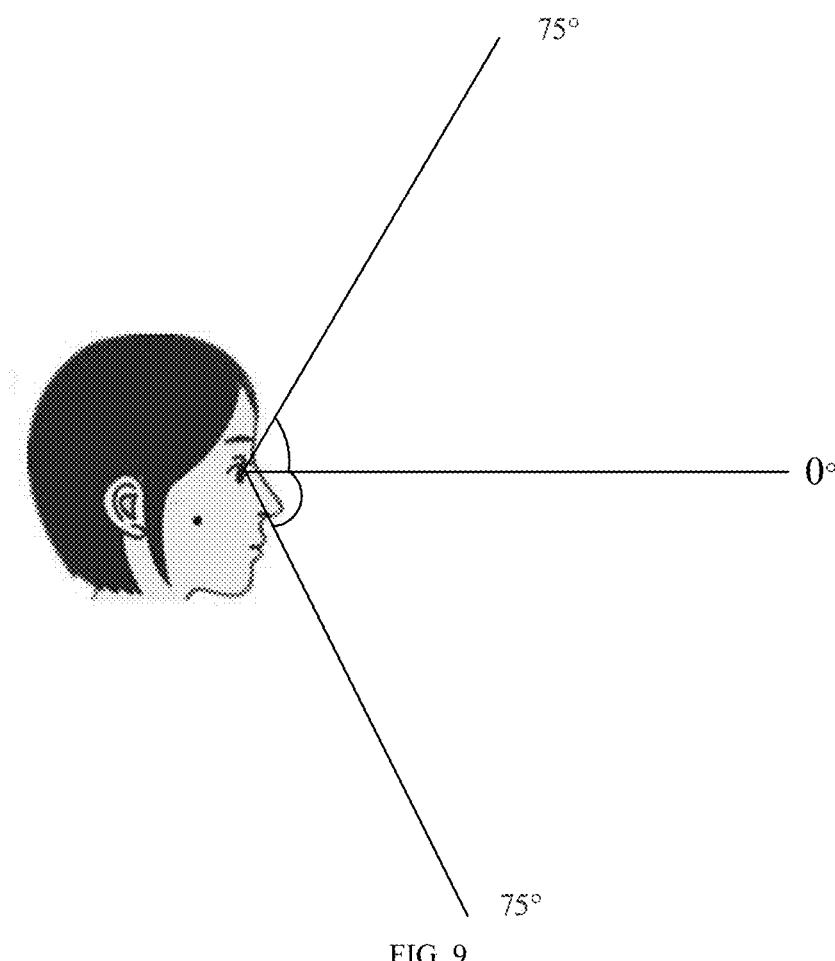
FIG. 9 illustrates a schematic diagram of a viewing angle of a human eye in a vertical direction according to embodiments of the present disclosure.

Referring to FIG. 8, based on the above characteristics of the human eye vision, in this exemplary embodiment, $\angle a = \angle b = 115°$ is selected as the horizontal viewing angle of the left eye and the right eye in accordance with the above "binocular viewing angle III", and an eye model of the viewer is constructed by selecting a binocular overlapping field of view, i.e., $\angle c = 124°$. Taking an intersection A of $\angle a$ and $\angle b$ as a vertex and a midpoint B of the line connecting the two eyes to form a ray BA, and using the ray BA as a 0° line, the left and right sides of the 0° line each has an angle of 62° (i.e., $\angle e$ and $\angle f$ shown in the figure), then the range of 124° of a ray AC and a ray AD defines the horizontal field of view. Similarly, referring to FIG. 9, in the vertical direction, the range of the upper angle of 75° and the lower angle of 75° defines the vertical field of view.

Step S620, determining a projected area of the field of view of the viewer on the display device.

Step S630, determining the projected area as the visible area corresponding to the viewer.

Figure 10:
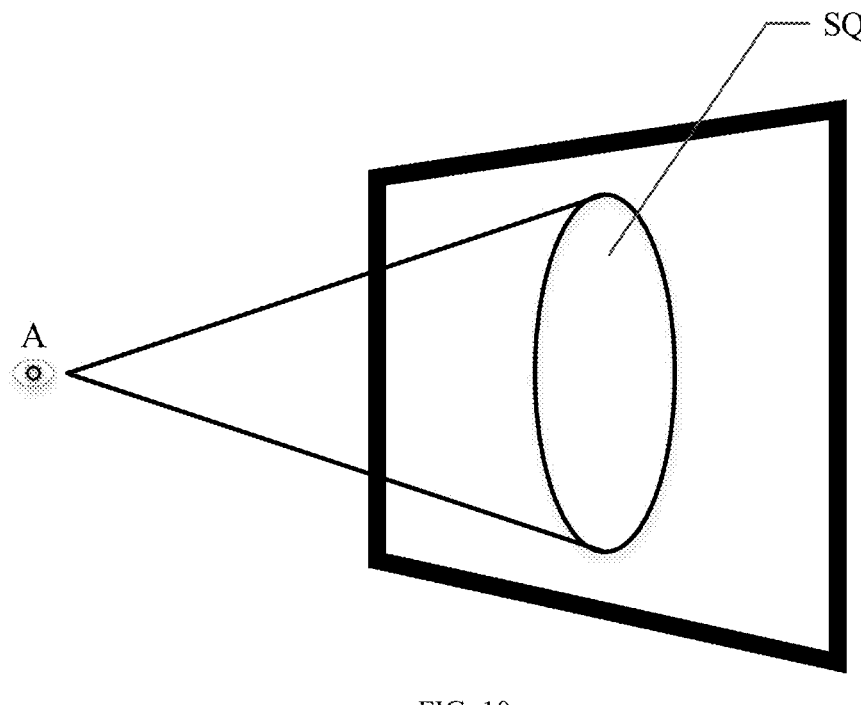
FIG. 10 illustrates a schematic diagram of a visible area of a viewer according to embodiments of the present disclosure.

Referring to FIG. 10, in the eye model of the viewer, with the vertex A as an equivalent viewpoint, the projected area of the horizontal and vertical fields of view on the whiteboard in the absence of an occlusion is denoted as SQ. In this way, the projected area SQ may be determined as the visible area corresponding to the viewer.

Figure 11:
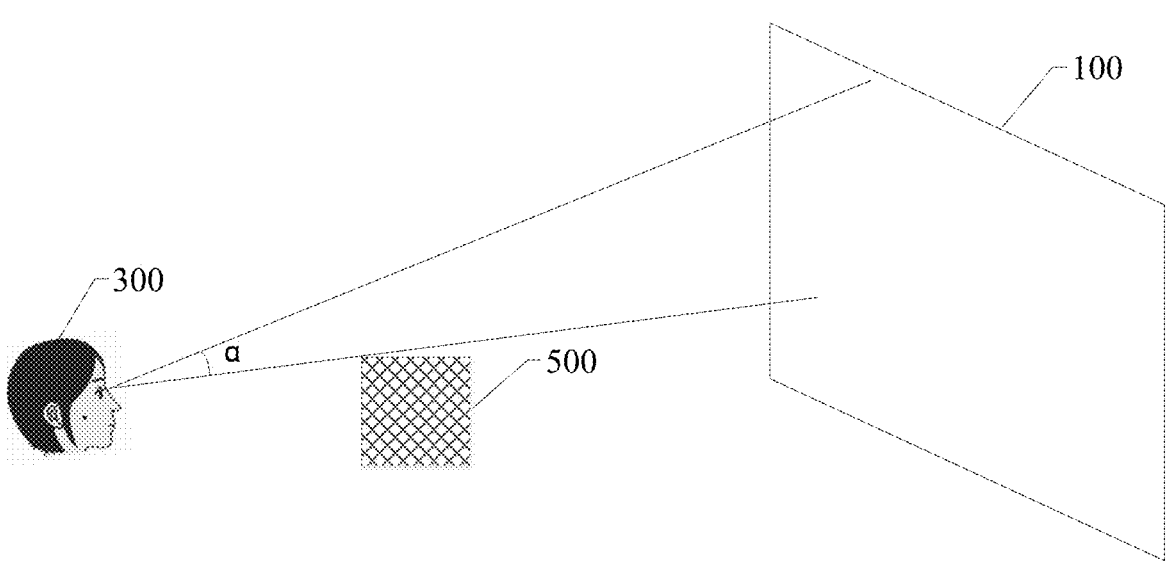
FIG. 11 illustrates a schematic diagram of an application scenario of a method for displaying content according to embodiments of the present disclosure.
Figure 12:
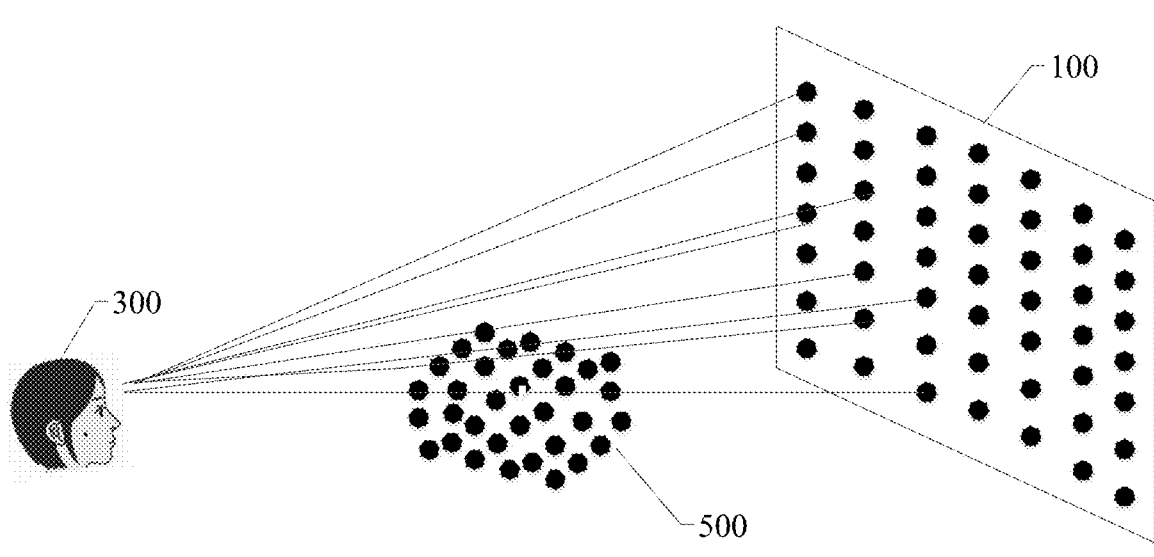
FIG. 12 illustrates a schematic diagram of an application scenario of a method for displaying content according to embodiments of the present disclosure.

Referring to FIG. 11, in actual scenarios, there is often a vision obstruction 500 between the viewer 300 and the display device 100, such as a speaker's body, another viewer's body, a table, a chair, a computer, and the like. Referring to FIG. 12, if no vision obstruction exists, a straight line may be determined between a three-dimensional pixel point of the viewer and a display unit of the display device; if the vision obstruction 500 exists, there will be an intersection point on the straight line between the three-dimensional pixel point of the viewer and the display unit of the display device. Based on this, it may be determined whether or not there is a vision obstruction between the viewer 300 and the display device 100, and thus, a visible area corresponding to the viewer can be determined based on the vision obstruction.

Figure 13:
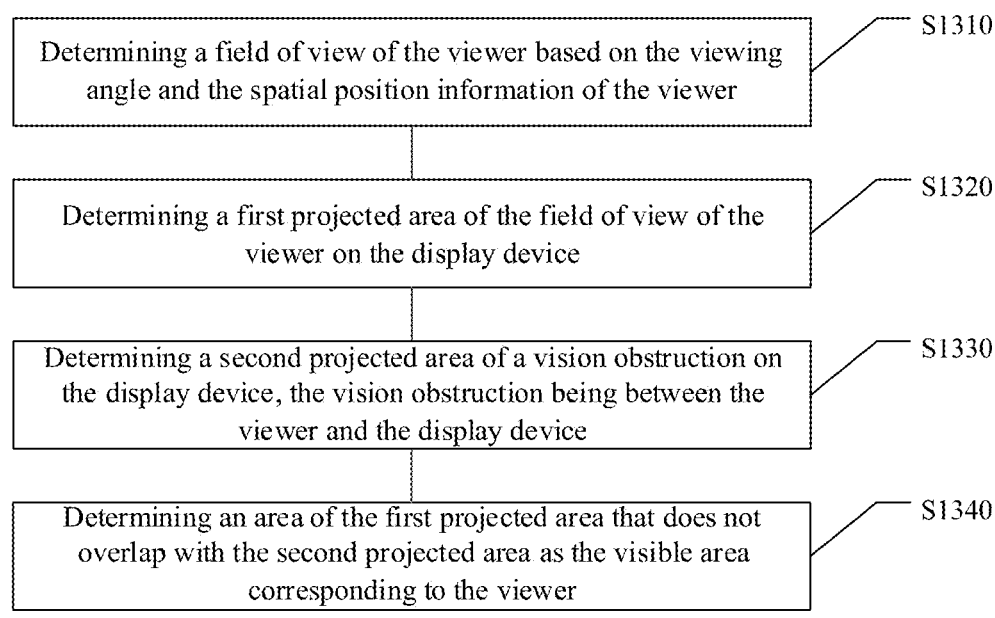
FIG. 13 illustrates a flowchart of determining a visible area of a viewer according to embodiments of the present disclosure.

Specifically, as shown in FIG. 13, in this exemplary embodiment, the visible area in the display device that corresponds to the viewer may be determined by the following steps S1310 to S1340.

Step S1310, determining a field of view of the viewer based on the viewing angle and the spatial position information of the viewer. This step is similar to the above step S610 and therefore will not be repeated.

Step S1320, determining a first projected area SQ of the field of view of the viewer on the display device. This step is similar to step S620 above and therefore will not be repeated.

Step S1330, determining a second projected area of a vision obstruction on the display device, the vision obstruction being between the viewer and the display device. For example, similar to step S320 above, in this exemplary embodiment, an image of the vision obstruction and corresponding depth information thereof may be collected, and spatial position information of the vision obstruction in the three-dimensional spatial coordinate system may be determined based on the image of the vision obstruction and the corresponding depth information thereof. Further, a second projected area SZ of the vision obstruction 500 on the display device 100 is calculated using the equivalent viewpoint of the viewer as a virtual point light source.

Figure 14:
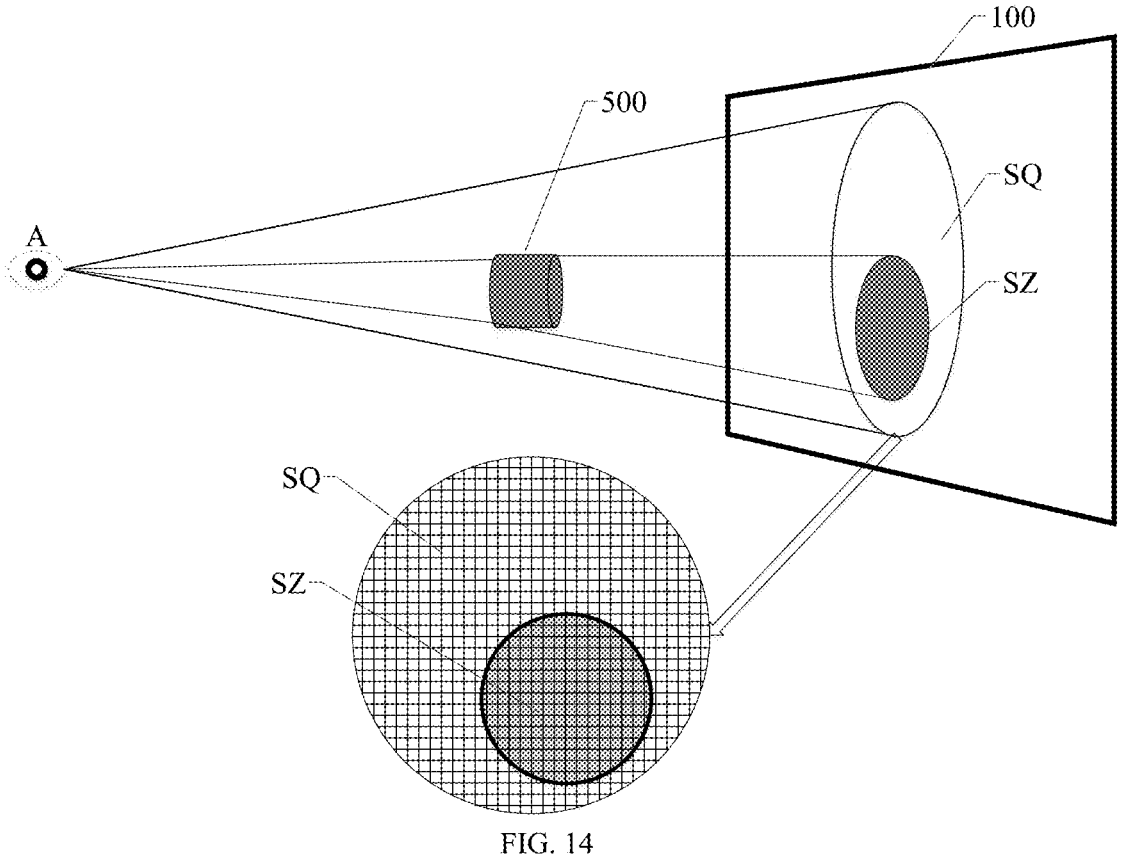
FIG. 14 illustrates a schematic diagram of a visible area of a viewer according to embodiments of the present disclosure.

Step S1340, determining an area of the first projected area that does not overlap with the second projected area as the visible area corresponding to the viewer. For example, as shown in FIG. 14, the visible area corresponding to the viewer is equal to the first projected area SQ—the second projected area SZ. However, in some exemplary embodiments, if the second projected area is not completely located in the first projected area, the visible area corresponding to the viewer is equal to the first projected area SQ—an area of overlap between the second projected area and the first projected area. This is not specifically limited in this exemplary embodiment.

Figure 15:
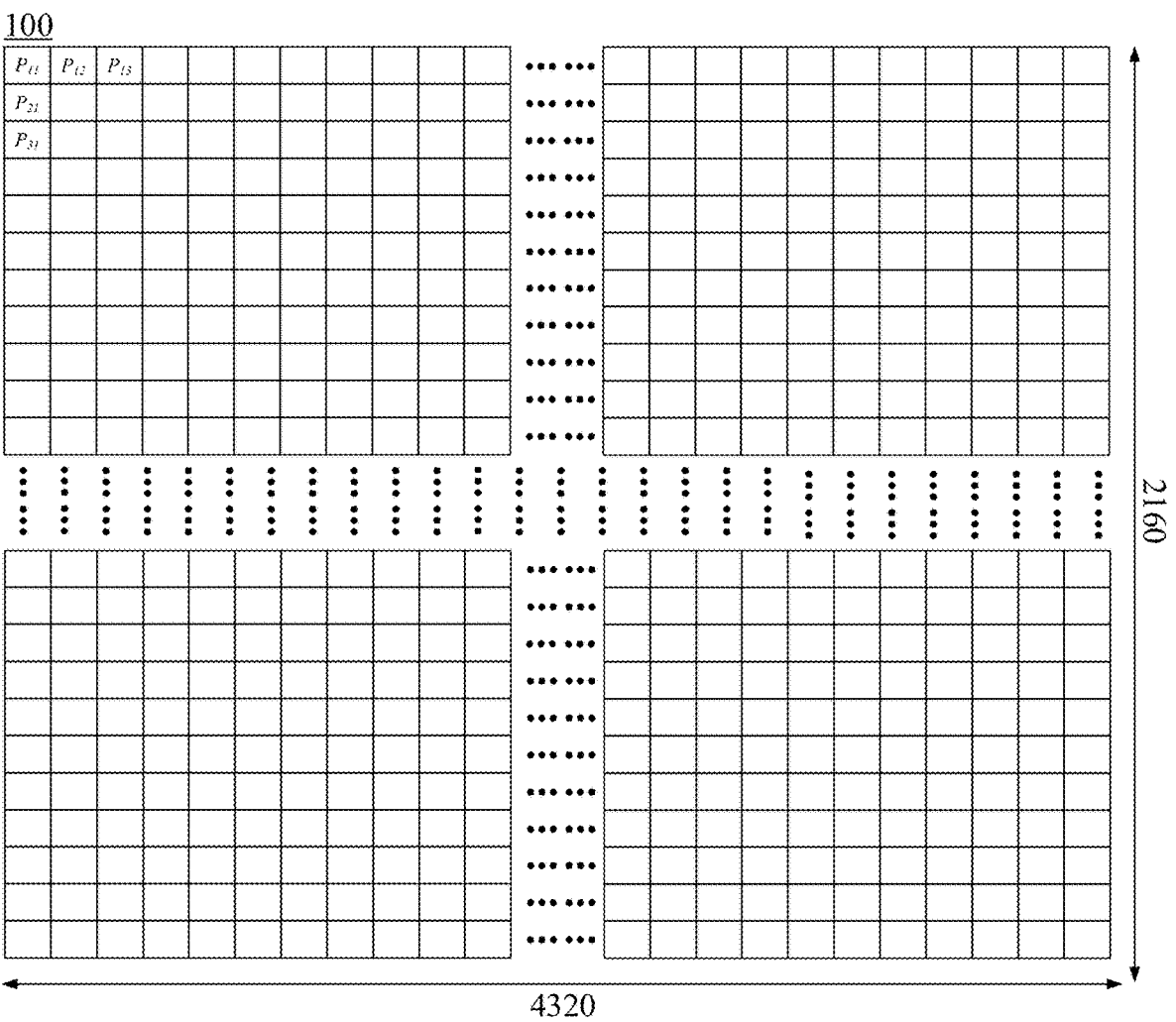
FIG. 15 illustrates a schematic diagram of a display device according to embodiments of the present disclosure.

Further, in order to quantify the size of the visible area corresponding to the viewer, the display device may be divided into a plurality of display units distributed in an array in this exemplary embodiment, and each display unit contains the same number of sub-pixels. For example, as shown in FIG. 15, each display unit contains one sub-pixel, and the display device may be divided into m rows and n columns of display units based on a resolution ratio of the display device. For example, if the resolution ratio of a 65-inch whiteboard is 4320×2160 and the screen size of the whiteboard is 1439 mm×809.3 mm, the length of each display unit is 1439 mm/4320=0.333 mm, the width of each display unit is 809.3 mm/2160=0.3746 mm, and the size of the area of each display unit is equal to 0.333 mm×0.3746 mm. The display units may be named respectively according to the row and column in which they are located as $P_{11}$, $P_{12}$. . . $P_{mn}$. In this case, the whole display device can be represented as:

$$P = \begin{bmatrix} P_{11} & P_{12} & P_{13} & \ldots & P_{1n} \\ P_{21} & P_{22} & P_{23} & \ldots & p_{2n} \\ P_{31} & P_{32} & P_{33} & \ldots & P_{3n} \\ \ldots & \ldots & \ldots & \ldots & \ldots \\ P_{m1} & P_{m2} & P_{m3} & \ldots & P_{mn} \end{bmatrix}.$$

Correspondingly, in an exemplary embodiment, the visible area S corresponding to the viewer shown in FIG. 14 may be represented as:

$$S = SQ - SZ = \begin{bmatrix} P_{37} & P_{38} & P_{39} & \ldots & P_{3j} \\ P_{47} & P_{48} & P_{49} & \ldots & P_{4j} \\ P_{57} & P_{58} & P_{59} & \ldots & P_{5j} \\ \ldots & \ldots & \ldots & \ldots & \ldots \\ P_{i7} & P_{i8} & P_{i9} & \ldots & P_{ij} \end{bmatrix} - \begin{bmatrix} P_{77} & P_{78} & P_{89} & \ldots & P_{3K} \\ P_{87} & P_{88} & P_{89} & \ldots & P_{4K} \\ P_{97} & P_{98} & P_{99} & \ldots & P_{5K} \\ \ldots & \ldots & \ldots & \ldots & \ldots \\ P_{j11} & P_{j12} & P_{j13} & \ldots & P_{jK} \end{bmatrix} =$$

$$\begin{bmatrix} P_{37} & P_{38} & P_{39} & \ldots & P_{3j} \\ P_{47} & P_{48} & P_{49} & \ldots & P_{4j} \\ P_{57} & P_{58} & P_{59} & \ldots & P_{5j} \\ \ldots & \ldots & \ldots & \ldots & \ldots \\ P_{i66} & P_{i67} & P_{i68} & \ldots & P_{xy} \end{bmatrix}.$$

In step S220, a writing area of a writer in the display device is determined and a display area in the display device, other than the writing area, is determined as a candidate area.

In this exemplary embodiment, the written content of the writer in the display device may first be acquired. For example, the handwriting of the writer is detected and all the handwriting is taken as the written content. Secondly, a rectangular area that minimizes an enclosure of the written content is determined as the writing area. Of course, in more exemplary embodiments, the other minimal convex polygonal area (e.g., a trapezoidal area, a regular hexagonal area, etc.) or circular area that can enclose the written content may also be determined as the writing area, which is also within the scope of protection of the present disclosure.

In some exemplary embodiments, the writing area may also be a fixed area in the display device, so that it can be directly accessed without having to be re-determined. In some exemplary embodiments, the writing area may also be determined with the help of the writer. For example, the writer may circle certain areas (with or without written content) in the display device as the writing area. In this exemplary embodiment, there is no special limitation on the specific manner of determining the writing area.

In step S230, a target area corresponding to the writing area is determined for the viewer in the candidate area based on the visible area.

Figure 16:
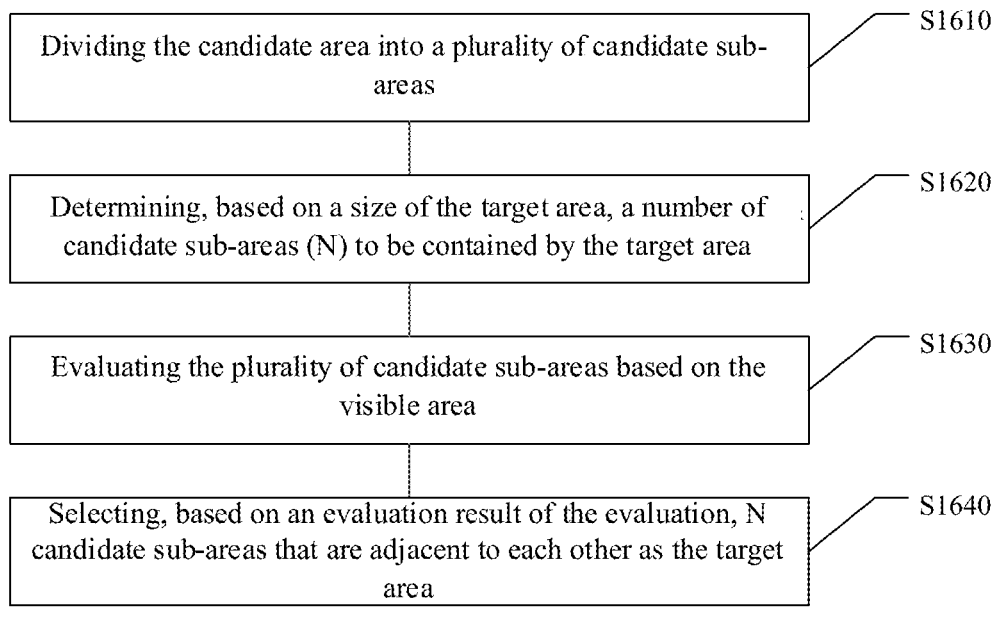
FIG. 16 illustrates a flowchart of determining a target area according to embodiments of the present disclosure.

As shown in FIG. 16, in this exemplary embodiment, the target area corresponding to the writing area may be determined for the viewer in the candidate area by the following steps S1610 to S1640.

Step S1610, dividing the candidate area into a plurality of candidate sub-areas.

In this exemplary embodiment, the display device may be divided into a plurality of sub-areas in advance, and then after determining the candidate area, the sub-areas contained in the candidate area are determined to be the candidate sub-areas contained in the candidate area. That is, a division result of the candidate area is obtained based on a division result of the display device. Alternatively, the division may also be performed on the candidate area to obtain the plurality of candidate sub-areas after the candidate area is determined. This is not specifically limited in this exemplary embodiment.

For example, the display device may be divided in accordance with a predetermined division rule in this exemplary embodiment. For example, if the display device is divided into sub-areas each containing 240×120 sub-pixels, the above display device with 4320×2160 resolution ratio will be divided into 18×18=324 sub-areas, and then, after determining a candidate area, each sub-area within the range of the candidate area can be determined as a candidate sub-area contained in the candidate area. For example, the specific division rules may be specifically determined according to the attributes of the display device, which are not specifically limited in this exemplary embodiment.

Step S1620, determining, based on a size of the target area, a number of candidate sub-areas (N) to be contained by the target area.

In this exemplary embodiment, the size of the target area may first be determined based on a size of the writing area, where the size of the target area is greater than or equal to the size of the writing area, and the size of the target area is an integer multiple of a size of a candidate area. For example, if the writing area includes 400×200 sub-pixels and the candidate sub-area includes 240×120 sub-pixels, the target area needs to contain 4 candidate sub-areas because the size of the target area is an integer multiple of the size of the candidate sub-area, and the target area includes 480×240 sub-pixels.

In other exemplary embodiments of the present disclosure, the writing area may also be enlarged by a predetermined number of times, and then the size of the target area may be determined based on the size of the enlarged writing area. For example, the writing area includes 400×200 sub-pixels, and in order to make the viewer more clearly recognize the written content, the writing area may be enlarged by X times, where X may be a positive number greater than 1, such as 1.5, 2, or 4, etc. If the writing area is enlarged by a factor of 2.25, the target area needs to include more than 600×300 sub-pixels. Since the above candidate sub-area includes 240×120 sub-pixels and the size of the target area is an integer multiple of the size of the candidate sub-area, the target area needs to contain 9 candidate sub-areas, and the target area includes 720×360 sub-pixels.

It is noted that in other exemplary embodiments of the present disclosure, the number of candidate sub-areas (N) to be contained in the target area may also be determined in other ways, and this is not limited in this exemplary embodiment.

Step S1630, evaluating the plurality of candidate sub-areas based on the visible area.

Figure 17:
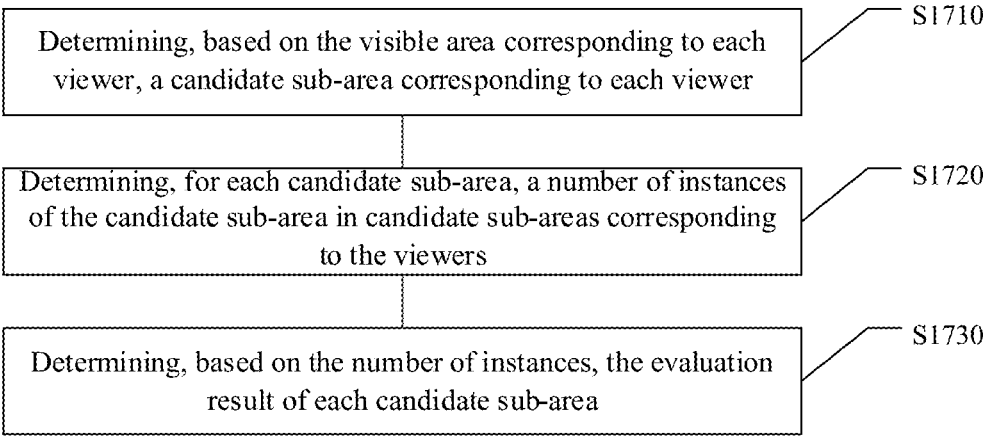
FIG. 17 illustrates a flowchart of determining an evaluation result of a candidate sub-area according to embodiments of the present disclosure.

As shown in FIG. 17, in this exemplary embodiment, the plurality of candidate sub-areas may be evaluated by the following steps S1710 to S1730.

Step S1710, determining, based on the visible area corresponding to each viewer, a candidate sub-area corresponding to each viewer. For example, referring to FIG. 18, it is assumed that according to the sub-pixels contained in the visible area determined in the above step 1340, it is determined that: visible area 301 corresponding to viewer A contains candidate sub-area 2, candidate sub-area 3, candidate sub-area 8, and candidate sub-area 9; visible area 302 corresponding to viewer B contains candidate sub-area 3, candidate sub-area 4, candidate sub-area 9, and candidate sub-area 10; and visible area 303 corresponding to viewer C contains candidate sub-area 9, candidate sub-area 10, candidate sub-area 15, and candidate sub-area 16. In addition, in this exemplary embodiment, the candidate sub-areas that are not fully contained in the visible area of the viewer may be regarded as not being candidate sub-areas contained by the visible area of the viewer, in order to reduce the complexity of the subsequent evaluation. For example, visible area 301 of viewer A does not contain candidate sub-area 1, candidate sub-area 7, candidate sub-area 13, candidate sub-area 14, and candidate sub-area 15; and visible area 302 of viewer B does not contain candidate sub-area 5, candidate sub-area 11, candidate sub-area 15, candidate sub-area 16, and candidate sub-area 17, and so on. However, in some exemplary embodiments, candidate sub-areas that are not fully contained in the visible area of the viewer may also be counted as the candidate sub-areas contained by the visible area of the viewer according to certain rules (e.g., according to a coefficient set by a size of an area), which is not specifically limited in this exemplary embodiment.

Step S1720, determining, for each candidate sub-area, a number of instances of the candidate sub-area in candidate sub-areas corresponding to the viewers. For example, continuing to refer to FIG. 18, candidate sub-area 3 is present in visible area 301 of viewer A and visible 302 of viewer B, respectively; candidate sub-area 9 is present in visible area 301 of viewer A, visible 302 of viewer B, and visible area 303 of viewer C, respectively; and candidate sub-area 10 is present in visible area 302 of viewer B and visible area 303 of viewer C, respectively, and so on. After counting, the number of instances of candidate sub-area 2, candidate sub-area 4, candidate sub-area 8, candidate sub-area 15, or candidate sub-area 16 in the candidate sub-areas corresponding to all viewers is 1; the number of instances of candidate sub-area 3 or candidate sub-area 10 in the candidate sub-areas corresponding to all viewers is 2; and the number of instances of candidate sub-area 9 in the candidate sub-areas corresponding to all viewers is 3.

Step S1730, determining, based on the number of instances, the evaluation result of each candidate sub-area. For example, continuing to refer to FIG. 18, candidate sub-area 9 has the highest number of instances, so a higher evaluation score may be set for candidate sub-area 9; and accordingly, candidate sub-area 2, candidate sub-area 4, candidate sub-area 8, candidate sub-area 15, or candidate sub-area 16 has a lower number of instances, so a lower evaluation score may be set for these candidate sub-areas. In this exemplary embodiment, the number of instances of the candidate sub-area may be directly set as an evaluation score of the candidate sub-area. For example, the evaluation score of candidate sub-area 9 is 3, and the evaluation score of candidate sub-area 2, candidate sub-area 4, candidate sub-area 8, candidate sub-area 15, or candidate sub-area 16 is 1. However, in other exemplary embodiments of the present disclosure, the number of instances of the candidate sub-area may be converted to a score on a percentage or ten-point scale; or, after performing a certain weighting operation on the number of instances of the candidate sub-area, a comprehensive calculation is performed to obtain the evaluation result of the candidate sub-area, which is not specifically limited in this exemplary embodiment.

Step S1640, selecting, based on an evaluation result of the evaluation, N candidate sub-areas that are adjacent to each other as the target area.

Figure 18:
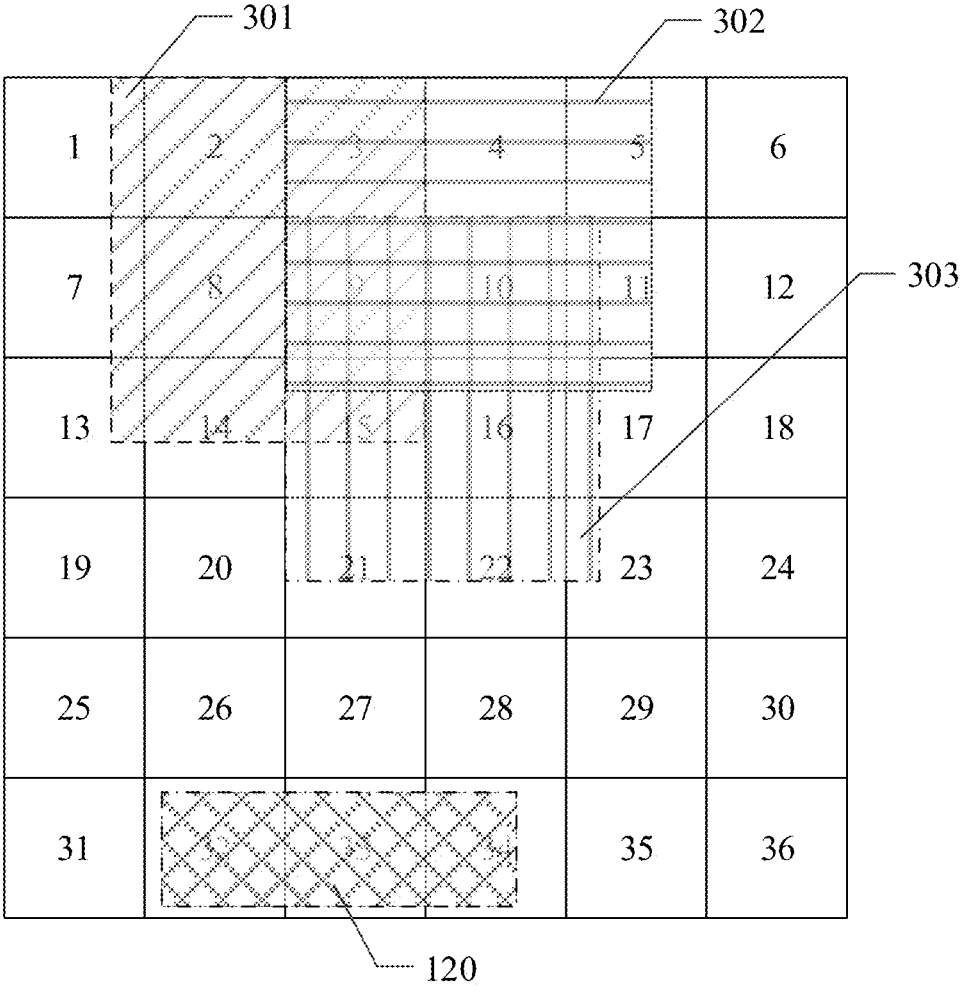
FIG. 18 illustrates a schematic diagram of a display device according to embodiments of the present disclosure.

Continuing to refer to FIG. 18, if target area 120 needs to contain 3 candidate sub-areas, the target area needs to contain at least candidate sub-area 9 because in an exemplary embodiment, candidate sub-area 9 has the highest evaluation score. The 3 candidate sub-areas that are adjacent to each other and contain candidate sub-area 9 are candidate sub-areas 7, 8, and 9, candidate sub-areas 8, 9, and 10, or candidate sub-areas 9, 10, and 11. Candidate sub-areas 7, 8, and 9 have a total evaluation score of 4, candidate sub-areas 8, 9, and 10 have a total evaluation score of 6, and candidate sub-areas 9, 10, and 11 have a total evaluation score of 5. Therefore, candidate sub-areas 8, 9, and 10 may serve as the target area.

However, it is readily understood by those skilled in the art that, in other exemplary embodiments of the present disclosure, it is also possible to select N candidate sub-areas that are adjacent to each other as the target area by other ways. For example, N candidate sub-areas with the highest total evaluation scores are directly selected as the target area, and the like. In other exemplary embodiments of the present disclosure, the candidate sub-area may also be evaluated in other ways. For example, the candidate sub-area is evaluated based on the position of the candidate sub-area in the visible area of each of the viewers, and the like. All of these fall within the scope of protection of the present disclosure.

In step S240, written content of the writing area is displayed within the target area.

In this exemplary embodiment, after determining the target area, the written content may be directly displayed in the target area. Alternatively, the written content may be processed and then displayed in the target area. For example, the handwriting of the written content may be deepened, optimized, or aligned, and so on, and then displayed in the target area.

In some exemplary embodiments of the present disclosure, the viewer may also be determined based on an instruction from the writer or other user for selecting a viewer. That is, in these exemplary embodiments, it may be that not all users viewing the display device are the aforementioned viewers, but only the users designated to view the display device are the aforementioned viewers. For example, the viewer may be determined based on the professional orientation, interest level, role, etc., of the user viewing the display device; or, the viewer may also be determined by the writer or other user based on the issues to be discussed, and the persons to be interacted with. Then, by the method in the present application, a target area is determined primarily for the viewer, and the written content of the writing area is displayed within the target area. In this way, the interaction between the speaker and the designated viewer can be more convenient, and the user experience and communication efficiency can be improved.

It is to be understood that although the individual steps in the flowchart of the accompanying drawings are shown in sequence as indicated by the arrows, these steps are not necessarily executed in the order indicated by the arrows in sequence. Unless expressly stated herein, the execution of these steps is not strictly limited in order, and they may be executed in other orders. Moreover, at least a portion of the steps in the flowchart of the accompanying drawings may include a plurality of sub-steps or a plurality of phases. These sub-steps or phases are not necessarily executed or completed at the same moment, but may be executed at different moments, and the order of execution thereof is not necessarily sequential, but may be executed in turn or alternately with other steps or with at least a portion of sub-steps or phases of the other steps.

Figure 19:
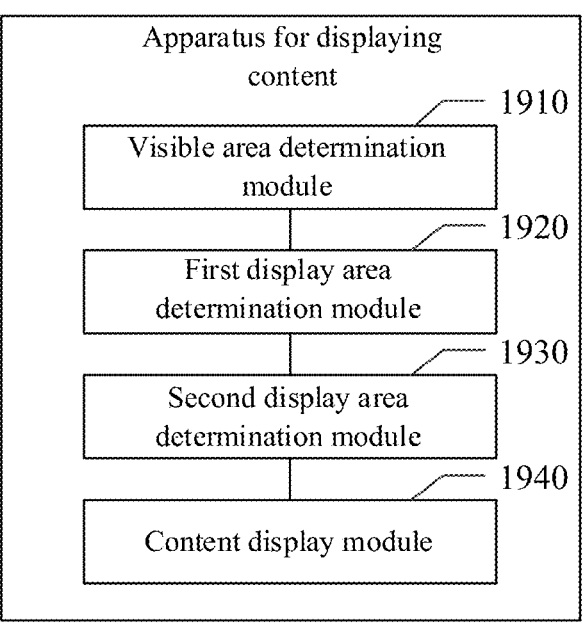
FIG. 19 illustrates a modular schematic diagram of an apparatus for displaying content according to embodiments of the present disclosure.

Further, an apparatus for displaying content is provided in the present exemplary embodiments. As shown in FIG. 19, an apparatus 1900 for displaying content may include a visible area determination module 1910, a first display area determination module 1920, a second display area determination module 1930, and a content display module 1940.

The visible area determination module 1910 may be configured to determine, based on a viewing angle and spatial position information of a viewer, a visible area corresponding to the viewer in a display device; the first display area determination module 1920 may be configured to determine a writing area of a writer in the display device, and determine a display area in the display device, other than the writing area, as a candidate area; the second display area determination module 1930 may be configured to determine, based on the visible area, a target area in the candidate area for the viewer, the target area corresponding to the writing area; and the content display module 1940 may be configured to display, within the target area, written content in the writing area.

The specific details of each module in the above-described apparatus for displaying content have been described in detail in the corresponding method for displaying content, and therefore will not be repeated here.

It is to be noted that although a number of modules or units of the apparatus for executing actions are mentioned in the detailed description above, the division of the modules or units is not mandatory. Actually, according to embodiments of the present disclosure, the features and functions of two or more modules or units described above may be embodied in a single module or unit. On the contrary, the features and functions of one module or unit described above may be further divided to be embodied by a plurality of modules or units.

Individual component embodiments of the present disclosure may be implemented in hardware, or in software modules running on one or more processors, or a combination thereof.

In exemplary embodiments of the present disclosure, there is further provided an electronic device including: a processor; and a memory configured to store instructions executable by the processor. The processor is configured to perform a method as described in any one of exemplary embodiments of the present disclosure.

Figure 20:
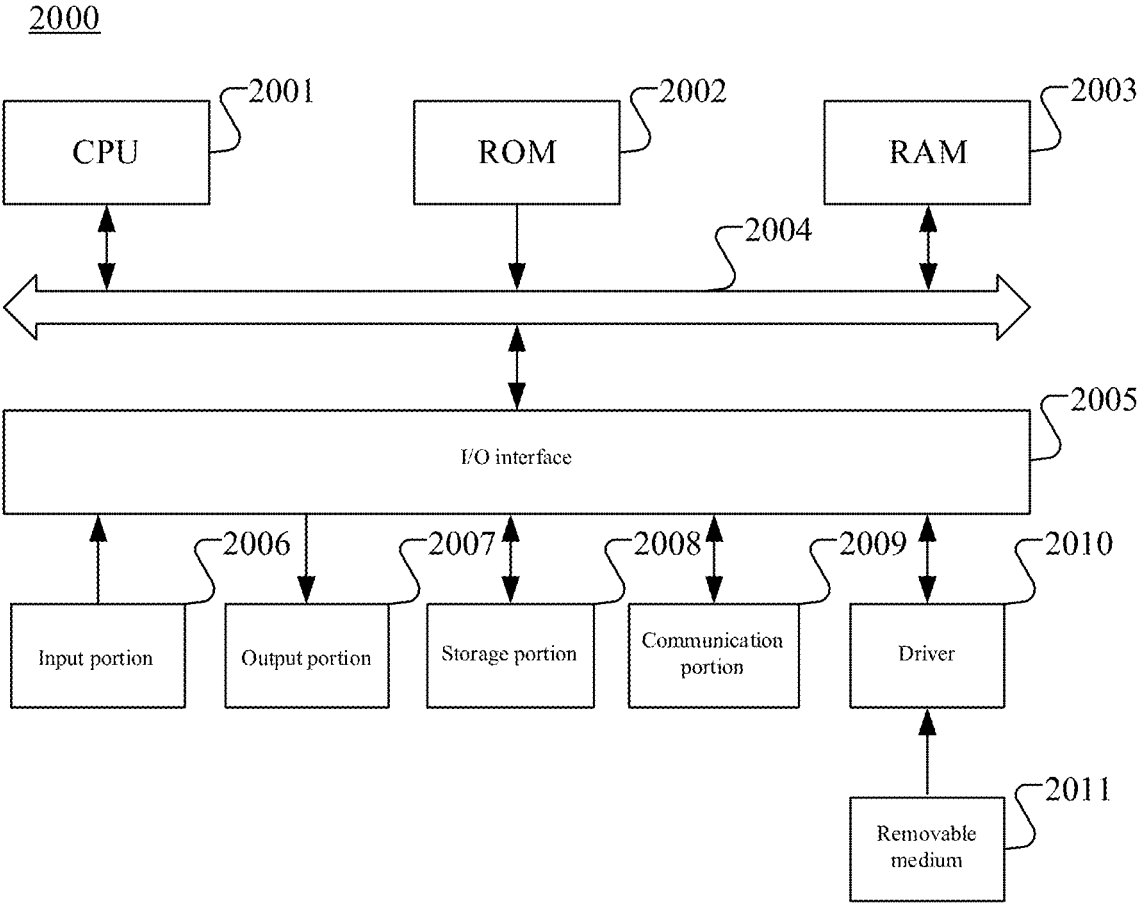
FIG. 20 illustrates a schematic diagram of a structure of a computer system for implementing an electronic device of embodiments of the present disclosure.

FIG. 20 illustrates a schematic diagram of a structure of a computer system for implementing an electronic device of embodiments of the present disclosure. It is to be noted that a computer system 2000 of the electronic device illustrated in FIG. 20 is an example only and should not constitute any limitation on the functionality and scope of use of the embodiments of the present disclosure.

As shown in FIG. 20, the computer system 2000 includes a central processor 2001 which can perform various appropriate actions and processes based on programs stored in a read-only memory 2002 or loaded from a storage portion 2008 into a random access memory 2003. The random access memory 2003 also stores various programs and data required for system operation. The central processor 2001, the read-only memory 2002, and the random access memory 2003 are connected to each other via a bus 2004. An input/output interface 2005 is also connected to the bus 2004.

The following components are connected to the input/output interface 2005: an input portion 2006 including a keyboard, a mouse, etc.; an output portion 2007 including a cathode ray tube (CRT), a liquid crystal display (LCD), etc., and a speaker, etc.; the storage portion 2008 including a hard disk, etc.; and a communication portion 2009 including a network interface card such as a local area network (LAN) card, a modem, etc. The communication portion 2009 performs communication processing via a network such as the Internet. A driver 2010 is also connected to the input/output interface 2005 as needed. Removable media 2011, such as disks, CD-ROMs, magneto-optical disks, semiconductor memories, and the like, are installed on the driver 2010 as needed so that computer programs read therefrom are installed into the storage portion 2008 as needed.

In particular, according to embodiments of the present disclosure, the process described above with reference to the flowchart may be implemented as a computer software program. For example, embodiments of the present disclosure provide a computer program product including a computer program carried on a computer-readable medium, the computer program including program code for performing the method shown in the flowchart. In such embodiments, the computer program may be downloaded and installed from a network via the communication portion 2009, and/or installed from a removable medium 2011. In the case that the computer program is executed by the central processor 2001, various functions defined in the apparatus of the present application are performed.

In exemplary embodiments of the present disclosure, there is further provided a non-volatile computer-readable storage medium having a computer program stored thereon. When the computer program is executed by a computer, the computer performs the method described in any one of the foregoing embodiments.

It is noted that the non-volatile computer-readable storage medium shown in the present disclosure may be, for example, but not limited to, an electrical, magnetic, optical, electromagnetic, infrared, or semiconductor system, apparatus, or device, or any combination thereof. More specific examples of computer-readable storage medium may include, but are not limited to: electrical connections having one or more wires, portable computer disks, hard disks, random access memory, read-only memory, erasable programmable read-only memory (EPROM or flash memory), optical fibers, compact disk read-only memory (CD-ROM) for portable computers, optical storage devices, magnetic storage devices, or any suitable combination thereof. In the present disclosure, a computer-readable storage medium may be any tangible medium that contains or stores a program that may be used by or in combination with an instruction execution system, apparatus, or device. And in the present disclosure, a computer-readable signaling medium may include a data signal propagated in a baseband or as part of a carrier that carries computer-readable program code. Such propagated data signals may take a variety of forms, including, but not limited to, electromagnetic signals, optical signals, or any suitable combination of thereof. The computer-readable signaling medium may also be any computer-readable medium other than a computer-readable storage medium that can send, propagate, or transmit a program for use by, or in combination with, an instruction execution system, apparatus, or device. The program code contained on the computer-readable medium may be transmitted using any suitable medium including, but not limited to: wireless, wire, optic cable, radio frequency, etc., or any suitable combination of thereof.

Those skilled in the art, after considering the specification and practicing the invention disclosed herein, will readily conceive of other embodiments of the present disclosure. This application is intended to cover any variations, uses, or adaptations of the present disclosure that follow the general principles of the present disclosure and that include common knowledge or conventional technical means in the art not disclosed herein. The specification and embodiments are to be considered exemplary only.

What is claimed is:

1. A method for displaying content, comprising:
determining, based on a viewing angle and spatial position information of a viewer, a visible area corresponding to the viewer in a display device;
determining a writing area of a writer in the display device, and determining a display area in the display device, other than the writing area, as a candidate area;
determining, based on the visible area, a target area in the candidate area for the viewer, the target area corresponding to the writing area; and
displaying, within the target area, written content of the writing area,
wherein the writing area is different from the target area,
wherein determining the target area corresponding to the writing area in the candidate area for the viewer comprises:
dividing the candidate area into a plurality of candidate sub-areas;
determining, based on a size of the target area, a number of candidate sub-areas (N) to be contained by the target area;
evaluating the plurality of candidate sub-areas based on the visible area; and
selecting, based on an evaluation result of the evaluation, N candidate sub-areas that are adjacent to each other as the target area, wherein N is an integer equal to or larger than 2,
wherein a plurality of viewers exist, and
wherein evaluating the plurality of candidate sub-areas based on the visible area comprises:
determining, based on the visible area corresponding to each viewer of the plurality of viewers, a candidate sub-area corresponding to each viewer;
determining, for each candidate sub-area, a number of instances of the candidate sub-area in candidate sub-areas corresponding to the plurality of viewers; and
determining, based on the number of instances, the evaluation result of each candidate sub-area.

2. The method of claim 1, wherein determining the visible area corresponding to the viewer in the display device comprises:

determining a field of view of the viewer based on the viewing angle and the spatial position information of the viewer;
determining a projected area of the field of view of the viewer on the display device; and
determining the projected area as the visible area corresponding to the viewer.

3. The method of claim 1, wherein determining the visible area corresponding to the viewer in the display device comprises:
determining a field of view of the viewer based on the viewing angle and the spatial position information of the viewer;
determining a first projected area of the field of view of the viewer on the display device;
determining a second projected area of a vision obstruction on the display device, the vision obstruction being between the viewer and the display device; and
determining a portion of the first projected area that does not overlap with the second projected area as the visible area corresponding to the viewer.

4. The method of claim 1, wherein determining the writing area of the writer in the display device comprises:
acquiring the written content of the writer in the display device; and
determining a rectangular area that minimizes an enclosure of the written content as the writing area.

5. The method of claim 1, further comprising:
determining, based on a size of the writing area, the size of the target area;
wherein the size of the target area is greater than or equal to the size of the writing area, and the size of the target area is an integer multiple of a size of a candidate sub-area.

6. The method of claim 5, wherein determining the size of the target area based on the size of the writing area comprises:
enlarging the writing area by a predetermined number of times; and
determining the size of the target area based on the size of the enlarged writing area.

7. The method of claim 1, further comprising:
acquiring a depth image of a scene, determining point cloud data of the scene based on the depth image, and creating a three-dimensional spatial coordinate system based on the point cloud data; and
collecting pose information of the viewer and determining the spatial position information of the viewer in the three-dimensional spatial coordinate system based on the pose information of the viewer.

8. The method of claim 1, further comprising:
determining the viewer based on an instruction for selecting a viewer.

9. An electronic device, comprising:
a processor; and
a memory configured to store one or more programs which, when executed by the processor, cause the processor to:
determine, based on a viewing angle and spatial position information of a viewer, a visible area corresponding to the viewer in a display device;
determine a writing area of a writer in the display device, and determine a display area in the display device, other than the writing area, as a candidate area;

determine, based on the visible area, a target area in the candidate area for the viewer, the target area corresponding to the writing area; and display, within the target area, written content of the writing area, wherein the writing area is different from the target area, wherein the processor is further configured to:

divide the candidate area into a plurality of candidate sub-areas;

determine, based on a size of the target area, a number of candidate sub-areas (N) to be contained by the target area;

evaluate the plurality of candidate sub-areas based on the visible area; and select, based on an evaluation result of the evaluation, N candidate sub-areas that are adjacent to each other as the target area, wherein Nis an integer equal to or larger than 2, wherein a plurality of viewers exist, and wherein the processor is further configured to:

determine, based on the visible area corresponding to each viewer of the plurality of viewers, a candidate sub-area corresponding to each viewer;

determine, for each candidate sub-area, a number of instances of the candidate sub-area in candidate sub-areas corresponding to the plurality of viewers; and determine, based on the number of instances, the evaluation result of each candidate sub-area.

10. A non-transitory computer-readable storage medium having stored thereon a computer program which, when executed by a processor, causes the processor to:

determine, based on a viewing angle and spatial position information of a viewer, a visible area corresponding to the viewer in a display device;

determine a writing area of a writer in the display device, and determine a display area in the display device, other than the writing area, as a candidate area;

determine, based on the visible area, a target area in the candidate area for the viewer, the target area corresponding to the writing area; and display, within the target area, written content of the writing area, wherein the writing area is different from the target area, wherein the processor is further configured to:

divide the candidate area into a plurality of candidate sub-areas;

determine, based on a size of the target area, a number of candidate sub-areas (N) to be contained by the target area;

evaluate the plurality of candidate sub-areas based on the visible area; and select, based on an evaluation result of the evaluation, N candidate sub-areas that are adjacent to each other as the target area, wherein N is an integer equal to or larger than 2, wherein a plurality of viewers exist, and wherein the processor is further configured to:

determine, based on the visible area corresponding to each viewer of the plurality of viewers, a candidate sub-area corresponding to each viewer;

determine, for each candidate sub-area, a number of instances of the candidate sub-area in candidate sub-areas corresponding to the plurality of viewers; and determine, based on the number of instances, the evaluation result of each candidate sub-area.

11. The electronic device of claim 9, wherein the processor is further configured to:

determine a field of view of the viewer based on the viewing angle and the spatial position information of the viewer;

determine a projected area of the field of view of the viewer on the display device; and determine the projected area as the visible area corresponding to the viewer.

12. The electronic device of claim 9, wherein the processor is further configured to:

determine a field of view of the viewer based on the viewing angle and the spatial position information of the viewer;

determine a first projected area of the field of view of the viewer on the display device;

determine a second projected area of a vision obstruction on the display device, the vision obstruction being between the viewer and the display device; and determine a portion of the first projected area that does not overlap with the second projected area as the visible area corresponding to the viewer.

13. The electronic device of claim 9, wherein the processor is further configured to:

acquire the written content of the writer in the display device; and determine a rectangular area that minimizes an enclosure of the written content as the writing area.

14. The electronic device of claim 9, wherein the processor is further configured to:

determine, based on a size of the writing area, the size of the target area;

wherein the size of the target area is greater than or equal to the size of the writing area, and the size of the target area is an integer multiple of a size of a candidate sub-area.

15. The electronic device of claim 14, wherein the processor is further configured to:

enlarge the writing area by a predetermined number of times; and determine the size of the target area based on the size of the enlarged writing area.

16. The electronic device of claim 9, wherein the processor is further configured to:

acquire a depth image of a scene, determine point cloud data of the scene based on the depth image, and create a three-dimensional spatial coordinate system based on the point cloud data; and collect pose information of the viewer and determine the spatial position information of the viewer in the three-dimensional spatial coordinate system based on the pose information of the viewer.

* * * * *